United States Patent
Simpson

(10) Patent No.: US 6,889,990 B2
(45) Date of Patent: May 10, 2005

(54) SELF SUPPORTIVE MOTORCYCLE FENDER

(75) Inventor: Randy Simpson, Lynchburg, VA (US)

(73) Assignee: Milwaukee Iron, Inc., Lynchburg, VA (US)

( * ) Notice: Subject to any disclaimer, the term of this patent is extended or adjusted under 35 U.S.C. 154(b) by 0 days.

(21) Appl. No.: 10/426,841

(22) Filed: May 1, 2003

(65) Prior Publication Data

US 2004/0216936 A1 Nov. 4, 2004

(51) Int. Cl.[7] .............................................. B62D 25/16
(52) U.S. Cl. .................................... 280/152.1; 280/219
(58) Field of Search ................................ 180/219, 220; 280/152.1–152.3, 160, 160.1; 293/105, 106

(56) References Cited

U.S. PATENT DOCUMENTS

| | | | |
|---|---|---|---|
| 4,366,880 A | 1/1983 | Miller et al. | |
| 4,422,659 A | 12/1983 | Nebu | |
| 4,485,884 A | 12/1984 | Fukunaga et al. | |
| 4,500,101 A | * 2/1985 | Aoki | 280/152.1 |
| 4,664,215 A | * 5/1987 | Suzuki et al. | 180/226 |
| 4,815,555 A | 3/1989 | Kishi et al. | |
| 5,299,832 A | 4/1994 | Price, Sr. | |
| 5,487,443 A | * 1/1996 | Thurm | 180/227 |
| 5,885,427 A | * 3/1999 | Pickering et al. | 204/293 |
| 6,073,948 A | * 6/2000 | Motojima et al. | 280/152.2 |
| 6,170,593 B1 | * 1/2001 | Hatanaka | 180/219 |
| 6,257,362 B1 | 7/2001 | Scherbarth | |
| 6,273,207 B1 | 8/2001 | Brown | |
| 6,318,743 B1 | * 11/2001 | Nakashima et al. | 280/152.1 |
| 6,502,658 B1 | * 1/2003 | Nagashii | 180/219 |
| 6,695,330 B2 | * 2/2004 | Hata | 280/152.3 |

OTHER PUBLICATIONS

Catalog, Milwaukee Iron, Steel Made in America, pp. 1–59, Milwaukee Iron, Inc., Copyright 2001.

* cited by examiner

Primary Examiner—Lesley D. Morris
Assistant Examiner—L. Lum
(74) Attorney, Agent, or Firm—Jacobson Holman PLLC

(57) ABSTRACT

A rear fender of a motorcycle is supported at one end by anchoring the fender in two rail supports of a rear subframe. Bolts supporting rear spring/damper units secure the one end of the fender. The fender includes two horizontally extending end flanges and two vertically extending side flanges. Vertically extending bolts pass through the horizontally extending flanges and are held by slugs located in rail supports of the rear subframe of the motorcycle.

6 Claims, 4 Drawing Sheets

US 6,889,990 B2

SELF SUPPORTIVE MOTORCYCLE FENDER

FIELD OF THE INVENTION

The present invention relates to a self supported motorcycle fender mounted on a tubular frame of a motorcycle or modification of an existing motorcycle to provide an anchoring location for the self supportive fender.

BACKGROUND OF THE INVENTION

Since the advent of modern day motorcycles in 1901 when the Werner brothers established the most desirable location for the positioning of a motorcycle engine at a low center point of the chassis, the use of motorcycles has increased tremendously. Whether used for commuting, delivering messages, touring or racing, the use of motorcycles has only increased throughout the years.

SUMMARY OF THE INVENTION

In view of the plethora of motorcycles, many individuals and industries have modified or accessorized existing motorcycles for an individual's personal taste. One example of a desirable motorcycle feature or modification, is the cantilever mounting of a rear motorcycle fender to provide a unique appearance and style.

Accordingly, it is an object of the present invention to modify an existing motorcycle to accommodate a rear motorcycle fender supported at one end in a cantilever manner. Alternatively, a motorcycle may be produced including such a cantilever mounted rear motorcycle fender.

This object is achieved by modifying a rear subframe of an existing motorcycle. Initially, a rearwardly projecting tubular portion of the rear subframe is removed beyond the rubber mounting bush of a shock absorber. The newly formed terminal edge of the rear subframe is ground away to conform to the shape of the shock absorber top mounting in the rear subframe.

A pair of tubular slugs are positioned at an upper end of each of two rail supports located on opposite sides of the motorcycle. The rail supports have one end positioned adjacent to the shock absorber top mounting. An opposite end of the rail supports is anchored to a tubular cradle frame of the motorcycle. The two slug portions include a central hole for receiving a ⅜ inch fine screw bolt.

A specially manufactured rear fender includes two bolt holes in two horizontally oriented flanges projecting from a platform located at an upper surface of one end of the fender. The ⅜ inch fine screw bolt passes through the two horizontally oriented bolt holes with one bolt passing into each of the two vertically extending rail supports located on opposite sides of the frame of the motorcycle adjacent to the shock absorber top mounting.

On opposite sides of the fender are located two vertically extending flanges having U-shaped openings sized to fit on the outer lateral sides of the two shock absorber top mountings. A bolt passing through the rubber mounting bush of each shock absorber or spring/damper unit passes through the vertically extending flanges of the rear fender. The bolt head holds the rear front fender and the spring damper unit in place.

Accordingly, it is another object of the present invention to mount a rear fender of a motorcycle from one end by anchoring the fender in two rail supports of a rear subframe and also on the bolts supporting rear spring/damper units.

It is another object of the present invention to mount a rear fender of a motorcycle from one end by anchoring the fender in two rail supports of a rear subframe and also on the bolts supporting rear spring/damper units by the fender having two horizontally extending end flanges and two vertically extending side flanges.

It is still yet another object of the present invention to mount a rear fender of a motorcycle from one end by anchoring the fender in two rail supports of a rear subframe and also on the bolts supporting rear spring/damper units by the fender having two horizontally extending end flanges and two vertically extending side flanges with vertically extending bolts passing through the horizontally extending flanges and the bolts being held by slugs located in the rail supports of the rear subframe.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
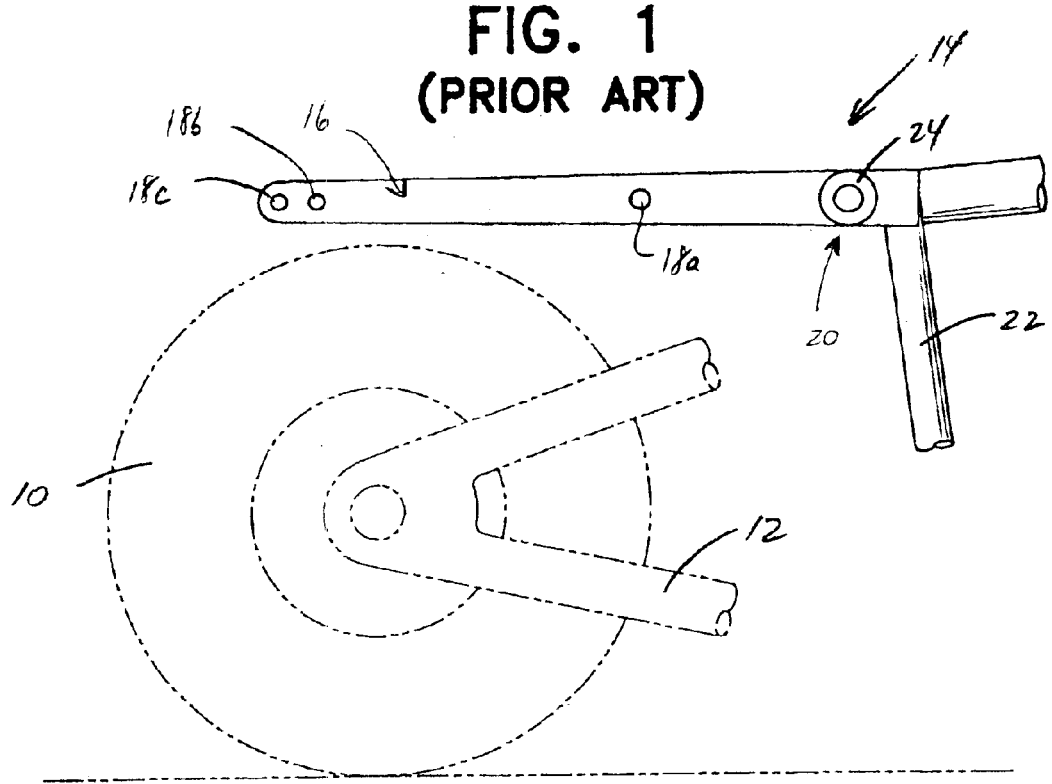
FIG. 1 is a schematic view of a conventional rear subframe of a motorcycle located above a rear wheel of the motorcycle and having a plurality of openings for bolting a rear fender around the rear wheel.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
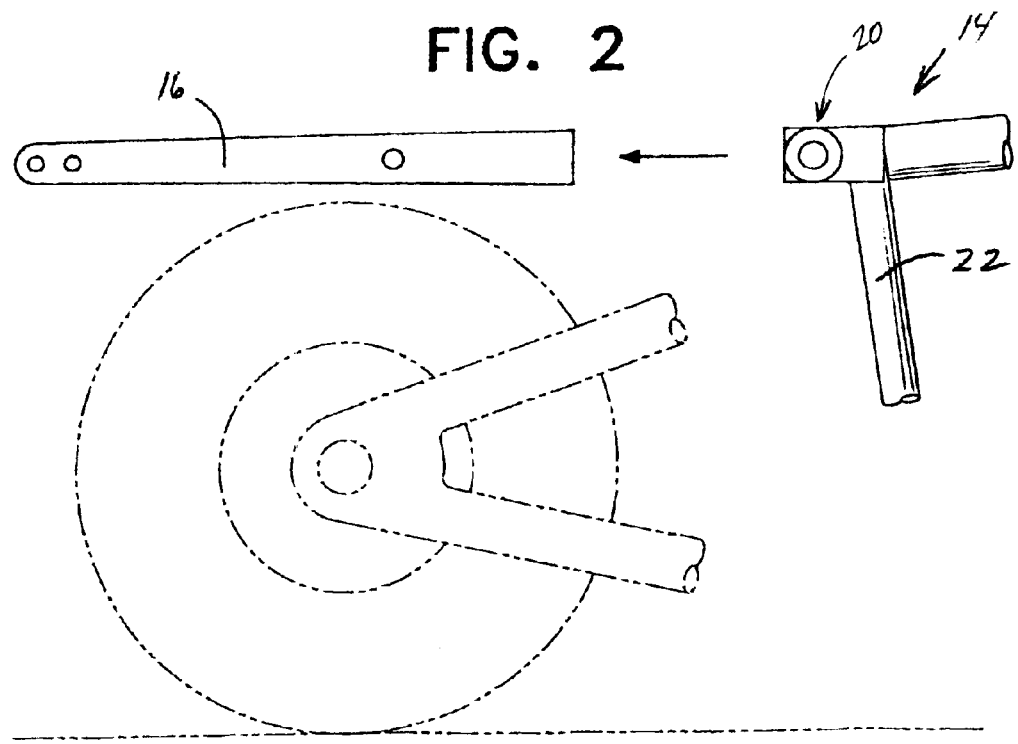
FIG. 2 schematically illustrates removal of a portion of the rear subframe.
Figure 3:
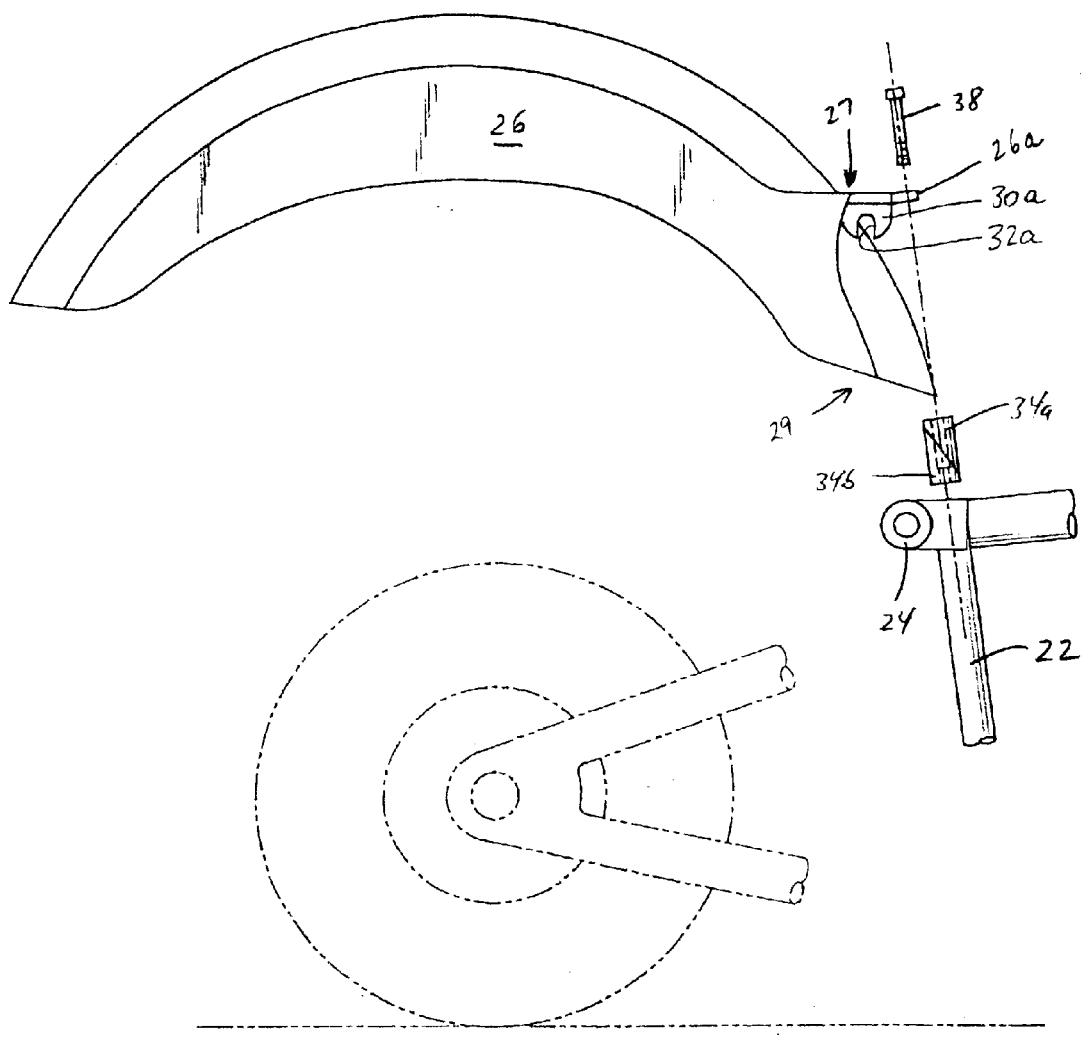
FIG. 3 schematically illustrates the grinding of the remaining portion of the rear subframe at the shock absorber top mounting and the insertion of slugs into a rail support for the rear subframe to accommodate a vertically extending bolt passing through horizontally extending flanges of the rear fender.

With reference to the drawings, in general, and to FIGS. 1 through 3, in particular, a rear wheel 10 of a motorcycle is shown as supported by V-shaped frame section 12 for mounting the rear wheel to a tubular cradle frame (not shown). Rear subframe 14 is shown having a rearwardly extending portion 16 with a plurality of holes 18a, 18b, 18c for typically mounting a rear fender to the rear subframe.

A shock absorber top mounting 20 provides an anchoring point for the upper portion of a spring-damper unit on each side of the frame. The rear subframe is supported by two rail supports 22 located on each side of the frame. The opposite end of the rail support is anchored on the tubular cradle frame (not shown).

To modify an existing motorcycle having a rear subframe 14 as shown in FIG. 1, the rearwardly extending portion 16 is removed as shown in FIG. 2. The remaining rear subframe 14 is significantly reduced in size as compared to FIG. 1.

Thereafter, as shown in FIG. 3, the edges of the rear subframe projecting beyond the round boss 24 of the shock absorber top mounting 20 are ground away so as to follow the curvature of the round boss 24 located at the shock absorber top mounting. This operation is performed on opposite sides of the motorcycle at the bosses 24.

Figure 6:
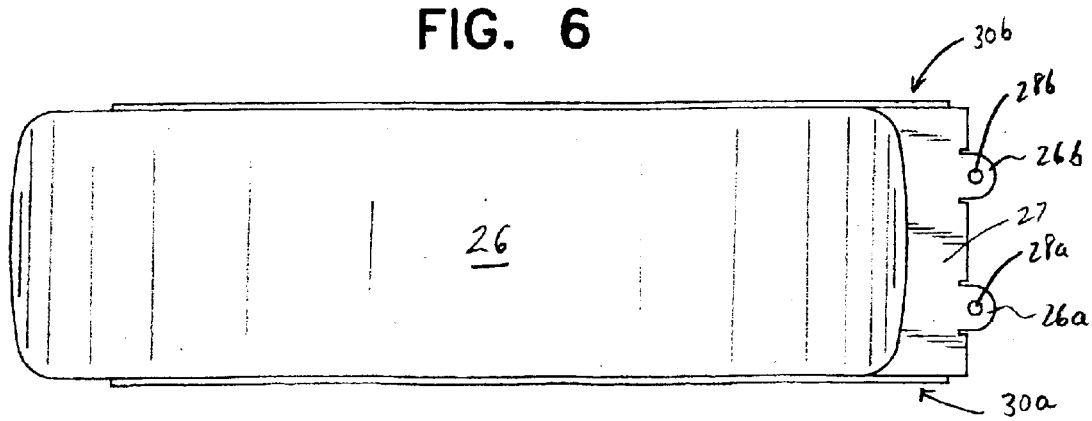
FIG. 6 is a plan view of the rear fender according to the present invention, illustrating the horizontally extending flanges which are secured to the rail supports for the rear subframe.
Figure 4:
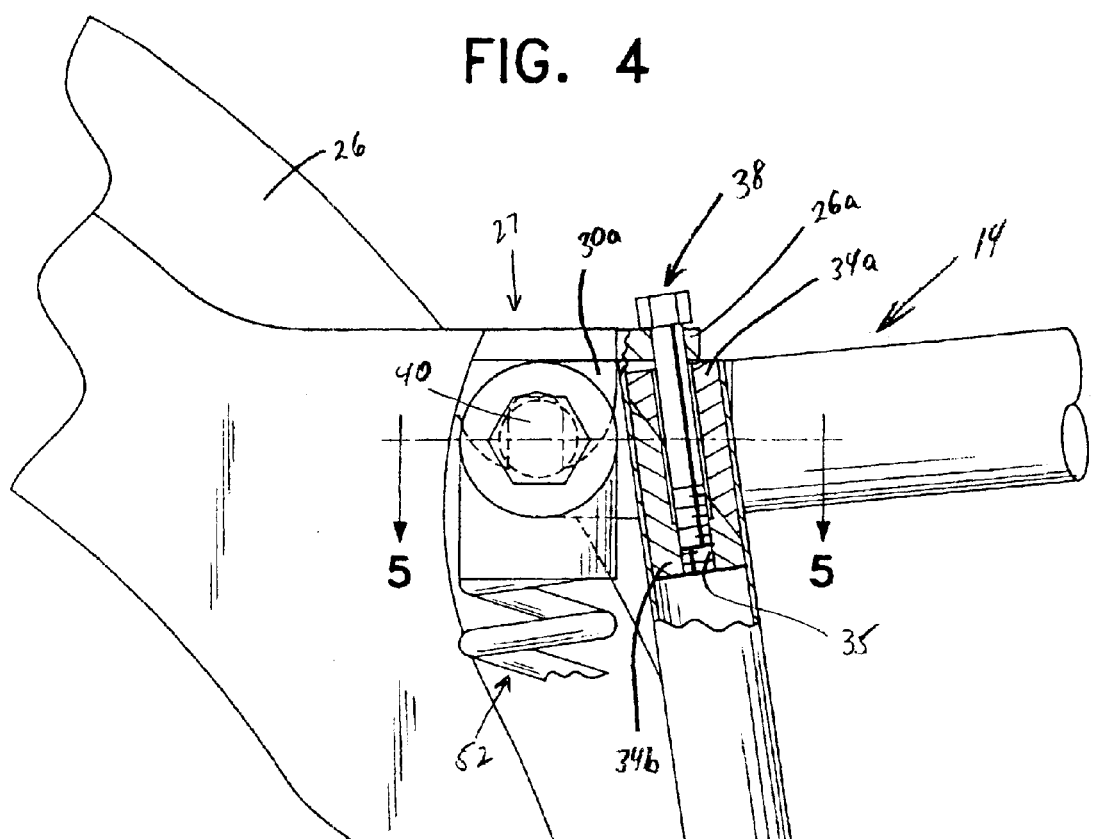
FIG. 4 is an enlarged partial cross-sectional view of the anchoring of one end of the rear fender in the rail supports of the rear subframe by vertically extending bolts passing through the horizontally extending flanges of the rear fender.
Figure 5:
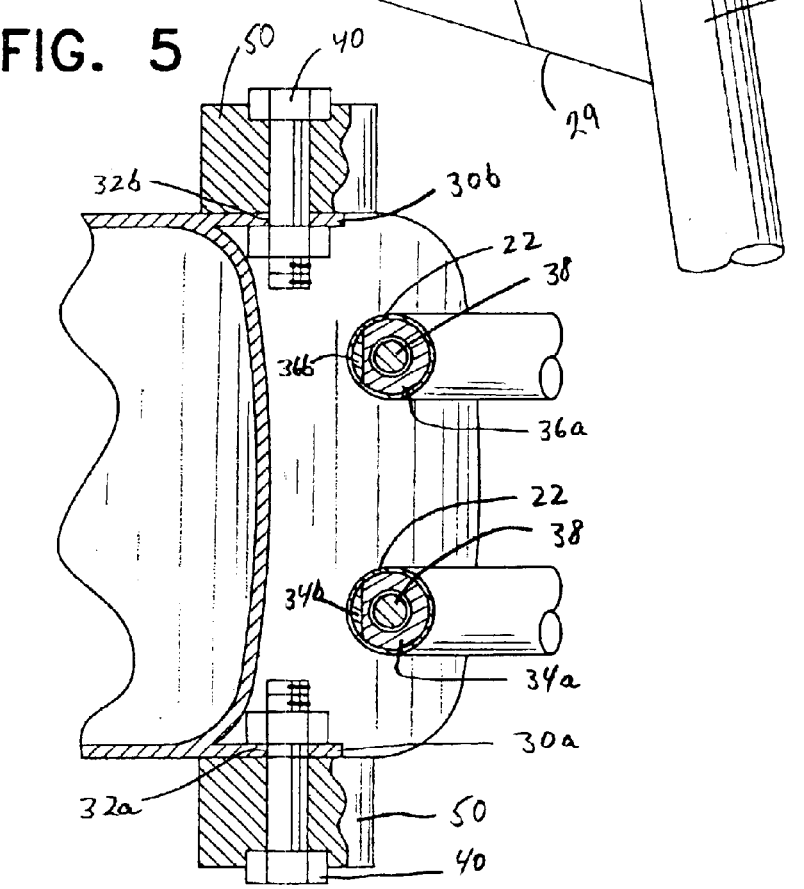
FIG. 5 is a section view taken along line 5—5 of FIG. 4 to illustrate the horizontally extending bolts passing through the vertically extending flanges of the rear fender and the rubber mounting bush of the spring/damper units to assist in anchoring one end of the rear fender to the rear subframe.

To mount the self supported fender 26 of the present invention on a motorcycle, the fender 26 includes two horizontally extending flanges 26a, 26b projecting from platform 27 as shown in FIG. 6. Platform 27 is spaced from the end 29 of fender 26.

The flanges 26a, 26b each include a hole 28a, 28b, respectively. The same end of the fender 26 having the horizontally extending flanges 26a, 26b includes opposite side vertically extending flanges 30a, 30b. Each of the flanges 30a, 30b, include a U-shaped downwardly projecting cutout portion 32a, with only the cutout for flange 30a being shown in the drawings. It is understood that a similar cutout is formed in flange 30b on the opposite side of the fender 26 from flange 30a.

To mount the self supportive fender 26 on the rear subframe 14, a pair of slugs 34a, 34b and 36a, 36b are fit within each of the two rail supports on opposite sides of the rear subframe 14. The slugs 34, 36 include a central opening and each pair of slugs includes a diagonal surface for sliding of each of the slug portions with respect to each other to accommodate different diameter openings for various rail supports 22.

A threaded portion 35 extends for approximately ½ inch from the lowermost surface of the lowermost slug portions 34b, 36b. The threaded portion 35 engages and grips the threaded portion of the bolt 38.

The remainder of the central opening of the slug portions is larger than the diameter of the bolt 38 so as to accommodate the relative sliding of the slug portions for limited different diameter rail supports 22. The maximum height of each of the slug portions is 1.75 inches. The angle of the mating diagonal surfaces of the slugs is approximately 25 degrees.

To anchor the fender 26, a ⅜ inch diameter bolt 38 extends through each of the openings 28a, 28b of the horizontally oriented flanges 26a, 26b and into the central openings of the slug pair portions 34a, 34b and 36a, 36b. Similarly, to anchor the side flanges 30a, 30b, a bolt 40 passes through the rubber mounting bush 50 of the spring/damper units 52 on opposite sides of the frame of the motorcycle and continues into the U-shaped openings 32a, 32b so as to secure the fender 26 in place.

Figure 7:
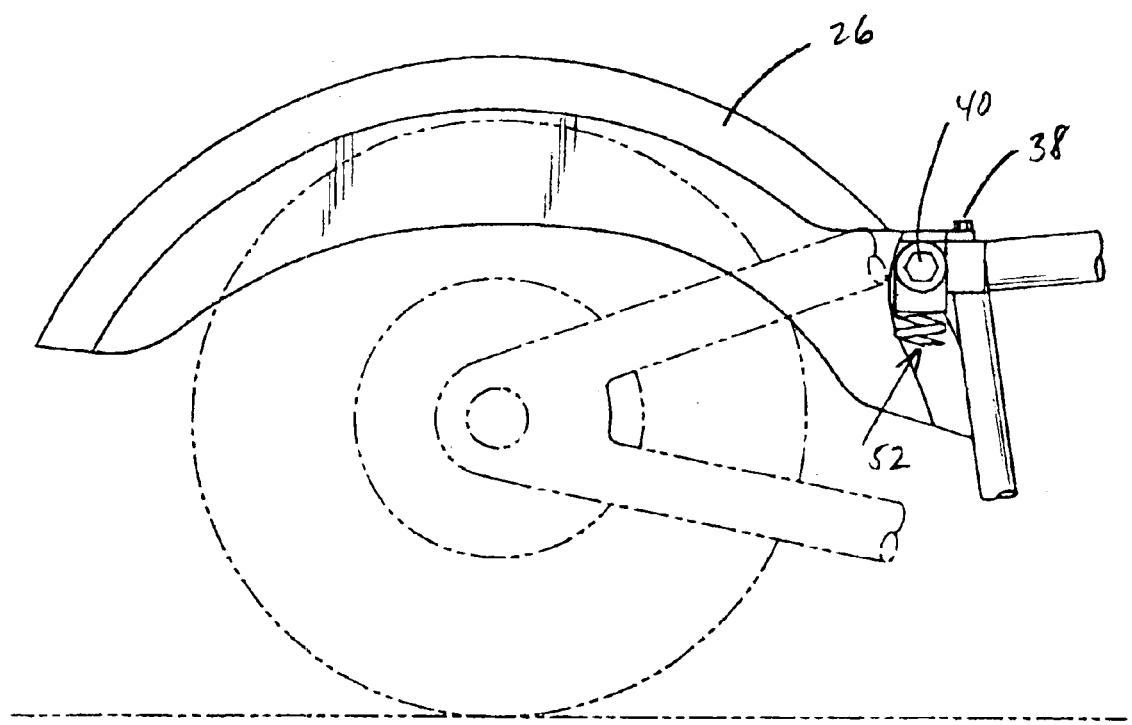
FIG. 7 schematically illustrates the self supportive motorcycle fender of the present invention mounted on a motorcycle.

By the tightening of the bolts 38 and bolts 40, the fender 26 is mounted in a self supportive manner on the rear subframe 14 of the motorcycle as shown in FIG. 7. Due to the multiple anchoring points, a secure connection is made between the fender 26 and the rear subframe 14.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A motorcycle comprising:
   a frame,
   a front wheel and a rear wheel,
   two shock absorbers mounted by bolts on opposite sides of said frame adjacent to said rear wheel, and
   a fender for said rear wheel, said fender being supported at one end on said frame, said bolts used for mounting said two shock absorbers on said frame being used to mount said fender on said frame.

2. A motorcycle as claimed in claim 1, wherein said bolts extend through flanges on opposite sides of said fender.

3. A motorcycle as claimed in claim 2, wherein said flanges include a U-shaped opening.

4. A motorcycle as claimed in claim 1, wherein two rail supports on said frame support said fender.

5. A motorcycle as claimed in claim 4, wherein said rail supports engage front flanges of said fender.

6. A motorcycle as claimed in claim 5, wherein said front flanges are spaced from said one end of said fender supported by said frame.

* * * * *